Dec. 16, 1941.  H. HOOVER, JR  2,266,040
GEOPHYSICAL PROSPECTING RECEPTOR CIRCUITS
Filed Sept. 16, 1937
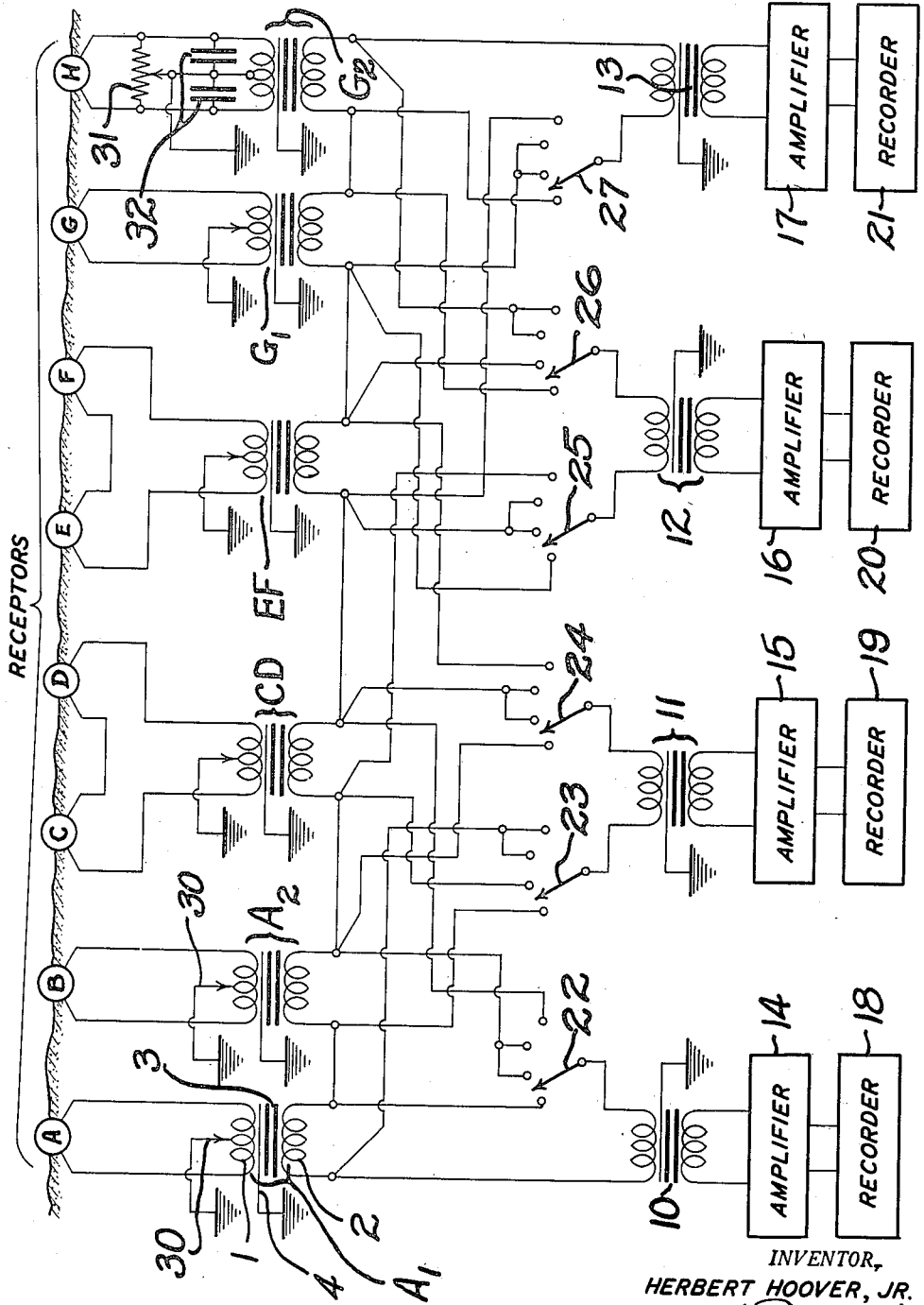
INVENTOR,
HERBERT HOOVER, JR.
BY
*Lippincott & Metcalf*
ATTORNEYS.

Patented Dec. 16, 1941

2,266,040

UNITED STATES PATENT OFFICE 2,266,040

GEOPHYSICAL PROSPECTING RECEPTOR CIRCUITS

Herbert Hoover, Jr., Sierra Madre, Calif., assignor to Consolidated Engineering Corporation, Los Angeles, Calif., a corporation of California Application September 16, 1937, Serial No. 164,100

17 Claims. (Cl. 177—352)

My invention relates to geophysical prospecting, and more particularly to electrical circuits whereby unwanted stray pickup and cross feed between multiple receptors may be minimized.

Among the objects of my invention are: To provide a geophysical receptor circuit which will minimize or eliminate stray pickup or cross feed due to the inherent unbalance to ground of part or all of the circuit; to provide circuits eliminating or minimizing stray pickup and cross feed between receptor lines operating simultaneously; to provide a geophysical prospecting receptor circuit for balancing out unwanted voltages or currents, such as those induced from electrical transmission lines, etc.; to provide a circuit which may be utilized to neutralize stray inductive and capacity pickup from other parts of the circuit where multiple receptors are utilized; and to provide a simple and efficient balanced input system between a geophysical receptor and an amplifying system, which will allow cross connection, grouping and choice of said multiple receptors.

My invention possesses numerous other objects and features of advantages, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

A simple geophysical receptor system consists of a receptor connected to the earth, an amplifier, and a recording device. The term receptor is intended to include any receiver or detector of waves, signals, or impulses of any nature whatever used in the geophysical exploration of the earth. In geophysical prospecting by means of seismic waves, earth vibrations are usually created artificially by the explosion of dynamite or similar material, and the artificial movements of the earth are picked up and turned into electrical impulses by the receptor, which may be of any particular type responsive to the frequencies of the earth vibrations it is desired to record. Such receptors are well known in the art and are of many types, and my invention is applicable to any of them.

The receptor cable, usually of the two wire line type, with or without a grounded shield, is connected to an amplifier, usually through an impedance matching transformer. The receptor and the cable portion, connected to the amplifier, may be isolated electrostatically from the amplifier by inserting a grounded electrostatic shield between the windings of the impedance matching transformer. Other precautions, such as cable shielding, resistor networks to ground across the primary of the impedance matching transformers, or other similar methods or combinations of methods, are well known in the art. The difficulties toward which the present invention is directed as a solution thereof arise, in most part, when multiple receptors, or receptors common to several circuits or amplifiers, are utilized. In such cases it is difficult, if not impossible, utilizing the systems of the prior art, to eliminate stray pickup and cross feed, due to the inherent unbalance to ground of part or all of the system.

Such multiple receptor systems are quite common in practice, examples of their use and advantages being shown in the U. S. patents to Salvatori, No. 2,064,385, and to North, No. 2,059,018. Each of these patents shows connections which may be used for the purposes set forth. In practice, however, it is more usual to connect an entire group of receptors in series, and to bridge each of the various amplifier inputs across one or more of the receptors, changing the connections to obtain the comparative records upon which the value of the method largely depends.

As is shown in the patents mentioned (and in accordance with general communication practice), it is customary to use impedance matching transformers in the circuits in order to obtain the maximum output from the receptors.

Whatever the connections used, however, the system is inherently susceptible to both electrostatic and electromagnetic induction, and usually to cross-feed between the respective receptors. Switching of connections will, in general, change all of these variable factors, and may gravely impair the value for comparison of the results obtained on the different records.

Broadly, my invention comprises balancing to ground (or deliberately unbalancing) each of the constituent sub-circuits of the system separately, and accomplishing the desired switching as between these balanced circuit elements. This is preferably accomplished by the addition in each of the circuits of an isolating transformer having a grounded electrostatic shield between primary and secondary, and either a center tapped winding or a suitable balancing network through which the connection to ground is effected.

Switching to regroup the receptors between successive recordings, is then accomplished between the balanced sub-circuits and the recording equipment.

Other broad objects of my invention may be more fully understood by direct reference to the drawing, the figure showing a circuit diagram showing eight receptors connected to four amplifiers, with all switching connections being performed between the isolation transformers and the impedance matching transformers.

Referring directly to the figure, which is illustrative of one particular set-up only, other set-ups being readily apparent to those skilled in the art, receptors A to H inclusive are embedded in the earth for the reception of ground waves, as is well known in the art. Receptors A and B and G and H are connected singly to isolation transformers $A_1$ and $A_2$ respectively, and $G_1$ and $G_2$ respectively. Receptors C and D and E and F are connected in series to isolation transformers CD and EF respectively. Each isolation transformer comprises a primary 1, a secondary 2, a core 3, and an electrostatic shield 4 between the windings, the latter being preferably grounded.

In this particular circuit, I prefer to use four recorder systems. These recorders comprise impedance matching transformers 10, 11, 12 and 13; amplifiers 14, 15, 16 and 17; and recorders 18, 19, 20 and 21. The general structure of the impedance matching transformers, the amplifiers and the recorders are all well known in the art, and will not be described again here.

Between the secondaries 2 of the isolation transformers and the primaries of the matching transformers, I prefer to insert four position switches 22, 23, 24, 25, 26 and 27, and interconnect the secondaries of the isolation transformers and the primaries of the impedance matching transformers so that in switch position #1, receptors A, B, G and H are directly connected to impedance matching transformers 10 and 11, and 12 and 13 respectively, to give four separate receptor channels.

When the switches are in switch position #2, receptors A and B are connected to amplifier 14, receptors C and D are connected to amplifier 15, receptors E and F are connected to amplifier 16, and receptors G and H are connected to amplifier 17.

In switch position #3, receptors A and B are connected to amplifier 14, and receptors A, B, C and D are connected to amplifier 15. Likewise, receptors E, F, G and H are connected to amplifier 16, and receptors G and H are connected to amplifier 17.

With the switch in position #4, receptors A, B, C and D are connected to amplifier 14; receptors A, B, C, D, E and F are connected to amplifier 15; receptors C, D, E and F, G and H, are connected to amplifier 16; and receptors E, F, G and H are connected to amplifier 17. Under these circumstances, the switches 22, 23, 24, 25, 26 and 27 may be ganged to operate as a unit, or if desired they can be operated separately to obtain other groupings, as will be readily apparent to those skilled in the art. Obviously, there is a large number of such combinations of position, as desired.

Inasmuch as the receptors are usually connected to the isolation transformers by quite long cables, the primaries of the isolation transformers may be utilized to balance out stray pickup coming in over the cables. The balancing to ground may be easily accomplished by providing center taps 30 on the primary of each of the isolation transformers, and I prefer in certain instances to make this tap variable in order that the line may be balanced off center, particularly where unequal lengths of cable, etc. are utilized.

I have shown straight grounded center taps in receptors A, B, C, D, E, F and G, but it is obvious that other methods of center tapping may be utilized, one such, for example, being shown in conjunction with receptor H, where a grounding network is shown, comprising a potentiometer 31 across the receptor line, centrally grounded, and connected to the midpoint of two isolation condensers 32 across the primary of isolation transformer $G_2$. Other balancing networks will be immediately apparent to those skilled in the art. Wherever, in the above description I have mentioned an impedance matching transformer connected to an implifier, it is to be understood that I include any coupling transformer ordinarily used to couple a signal source with a grid circuit to obtain operative efficiency. Transformers are preferred as such coupling devices in the present instance because they permit separate grounding of ordinary amplifiers without danger of introducing unwanted crossfeed. Strictly speaking, said transformers serve as voltage boosters rather than as exact impedance matching devices.

It will be apparent, therefore, upon examination of the drawing and from the explanation given above, that all the receptor lines are separately balanced to ground, and therefore only a minimum amount of stray interference is passed along to the amplifiers. It is also apparent that there will be a minimum potential difference between various parts of the receptor and receptor cable circuits, and cross feed is thereby minimized. It will further be apparent that a convenient circuit has been provided, whereby any particular configuration and combination of receptor and amplifiers can be set up, as may appear desirable from time to time. These combinations of receptors and amplifiers can be chosen by switching, without unbalancing the receptor or cable lines themselves.

I claim:

1. In a geophysical prospecting system, a receptor, a receptor line, an amplifier and recorder electrically connected in the named sequence, a coupling device between said line and said amplifier, and an isolation transformer between said line and said coupling device, the primary of said isolation transformer being grounded between the line connections thereof at a point which will balance the two sides of said line to ground.

2. Apparatus in accordance with claim 1, wherein the grounding connection is in substantially the center of said primary.

3. A geophysical prospecting set-up having a plurality of systems in accordance with claim 1, interconnecting means intermediate said isolation transformers and the said coupling devices whereby mixed records may be produced.

4. A geophysical prospecting system comprising a plurality of receptor circuits, each of said circuits including at least one receptor, a plurality of recorders, switching means for connecting said circuits to said recorders in a plurality of different arrangements, a coupling element in each of said receptor circuits interposed between said receptors and said switching means, and means associated with each of said coupling elements for grounding electrostatic and electromagnetic impulses induced in said receptor circuits without affecting said recorders.

5. A geophysical prospecting system comprising a plurality of receptor circuits, each of said circuits including at least one receptor, a plurality of recorders, switching means for connecting said circuits to said recorders in a plurality of different arrangements, a coupling element connected across each of said circuits between said receptors and said switching means, and a ground connection to the electrical center of each of said coupling elements.

6. A geophysical prospecting system comprising a plurality of receptor circuits, each of said circuits including at least one receptor, a plurality of recorders, switching means for connecting said circuits to said recorders in a plurality of different arrangements, a coupling transformer having a primary winding connected across each of said circuits and a secondary winding connected to said switching means, and means for effectively grounding the electrical center of each of said primary windings.

7. A geophysical prospecting system comprising a plurality of receptor circuits, each of said circuits including at least one receptor, a plurality of recorders, switching means for connecting said circuits to said recorders in a plurality of different arrangements, a coupling transformer having a primary winding connected across each of said circuits and a secondary winding connected to said switching means, means for effectively grounding the electrical center of each of said primary windings, and means for preventing the transfer of electrostatic charges between said primary and secondary windings.

8. The method of operating a geophysical prospecting system including a plurality of receptor circuits and a plurality of recorders which comprises the steps of electrically balancing each of said receptor circuits separately with respect to ground at a selected location adjacent said recorders, interconnecting said receptors and recorders between said location and said recorders, recording a first set of waves received by said receptors, changing the interconnections without disturbing the balance of the individual receptor circuits and recording a second set of waves received by said receptors.

9. The method of operating a geophysical prospecting system including a plurality of receptor circuits and a plurality of recorders, which comprises the steps of electrically balancing each of said receptor circuits separately with respect to ground, interconnecting said recorders, recording a first set of seismic waves received by said receptors, changing the interconnections between said recorders without disturbing the balance of the individual receptor circuits to ground, recording a second set of seismic waves received by said receptors, and comparing the records so obtained.

10. In a geophysical prospecting system, a receptor, a receptor line, an amplifier and recorder electrically connected in the named sequence, a coupling device between said line and said amplifier, an isolation transformer between said line and said coupling device, and adjustable means for grounding the primary of said isolation transformer between the line connections thereof.

11. A geophysical prospecting system comprising a plurality of receptors, each connected to one or more amplifiers and recorders by a transmission line, an isolation transformer for each transmission line intermediate said transmission lines and said amplifiers, means intermediate said isolation transformers and said recorders interconnecting various recording channels, and means associated with each isolation transformer for balancing the two sides of each transmission line to ground.

12. A geophysical prospecting system substantially as described in claim 11, wherein said balancing means comprises a ground connection to the electrical center of each isolation transformer primary.

13. The method of operating a geophysical prospecting system including a plurality of receptors, a plurality of receptor circuits, and a plurality of recorders, which comprises the steps of electrically balancing each of said receptor circuits separately with respect to ground, connecting each recorder to a separate receptor circuit, recording one set of seismic waves received by said receptors, connecting a plurality of said recorders to a plurality of said receptor circuits without disturbing the balance of the individual receptor circuits to ground, and recording another set of seismic waves received by said receptors.

14. A geophysical prospecting system comprising a plurality of receptors, a plurality of transmission lines each connected to at least one receptor, an isolation transformer and means associated therewith connecting each of said transmission lines to a plurality of amplifiers and recorders, and means associated with the primary of each isolation transformer for balancing the two sides of each transmission line to ground.

15. The method of seismic prospecting utilizing a plurality of receptor circuits and a plurality of recorders and in which seismic waves are received, converted to corresponding electrical waves, and transmitted through said receptor circuits to said recorders, which comprises the steps of electrically balancing the individual receptor circuits with respect to ground to eliminate extraneous electrical pickup and mixing the waves arriving over said receptor circuits prior to the application of said waves to said recorders while maintaining the balance of said receptor lines to ground.

16. A geophysical prospecting system having a plurality of systems in accordance with claim 1, means connecting said receptors to a single amplifier, said connecting means being between said isolation transformers and the said coupling devices.

17. Apparatus for geophysical prospecting comprising a plurality of receptors positioned in the earth at points spaced apart a distance sufficient to provide reception of related signals of different character, a transmission line for each receptor, a plurality of recorders, adjustable signal mixing means interconnecting said transmission lines and said recorders, so connected and arranged as to provide for controlling the relative strengths of signals applied from different receptors to any given recorder, isolation means intermediate each of said lines and said mixing means, and means for separately balancing each of said transmisison lines to ground, whereby adjustments made in said mixing circuit may be made while maintaining said balance to ground.

HERBERT HOOVER, Jr.